UNITED STATES PATENT OFFICE.

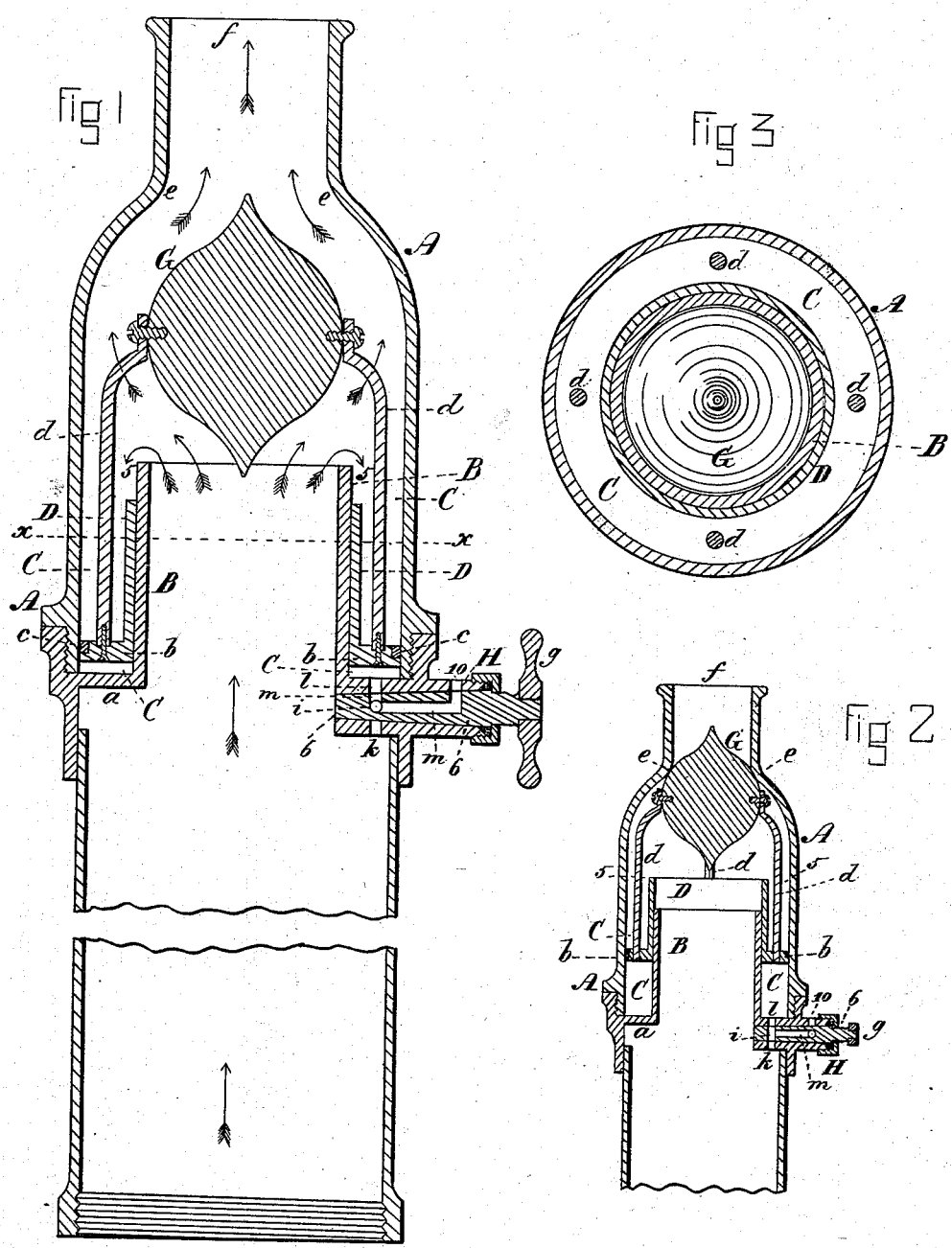

LORING D. SHAW, OF MELROSE, MASSACHUSETTS.

AUTOMATIC NOZZLE FOR HOSE-PIPES.

SPECIFICATION forming part of Letters Patent No. 263,731, dated September 5, 1882.

Application filed May 26, 1882. (No model.)

*To all whom it may concern:*

Be it known that I, LORING D. SHAW, a citizen of the United States, residing at Melrose, in the county of Middlesex and State of Massachusetts, have invented an Automatic or Self-Controlling Nozzle for Hose-Pipes, of which the following is a full, clear, and exact description, reference being had to the accompanying drawings, making part of this specification, in which—

Figure 1 is a longitudinal section through the center of the nozzle of a hose-pipe constructed in accordance with my invention, the valve being open. Fig. 2 is a similar section, on a reduced scale, showing the position of the parts when the valve is closed. Fig. 3 is a transverse section on the line $x\ x$ of Fig. 1.

Hose-pipes have heretofore been provided with stop-cocks or valves of various constructions to enable the hoseman to shut off the stream of water at the nozzle without the necessity of closing the hydrant or fire-plug, or stopping the fire-engine or pump, a "relief-valve" being used where an engine or pump is employed to prevent the bursting of the hose when the water is shut off at the hose-pipe. These stop-cocks or other shut-off devices when applied to hose-pipes have, however, proved objectionable on account of the difficulty of keeping them tight and preventing leakage, and also on account of the difficulty of operating them, caused by the excessive friction produced by the great pressure of the water thereon.

My invention has for its object to overcome these objections and to provide a hose-pipe nozzle in which the pressure of the water itself is caused to automatically close or open the valve which controls the stream, when allowed to do so, by the opening or closing of a small auxiliary valve or cock, which can be turned with a very slight expenditure of power, the construction and arrangement of parts being such as to insure freedom from wear and leakage, and great durability.

In the said drawings, A represents the nozzle of a hose-pipe, within which is located a short cylinder, B, forming an annular chamber, C, between the two, which is open at its upper end, 5, and closed at its lower end by the flange or partition $a$.

Over the cylinder B slides a snugly-fitting cylinder, D, provided at its bottom with an annular flange, $b$, which closely fits the chamber C, and is provided at its outer edge with a packing, $c$, thus forming a piston which is free to be moved up and down within the chamber C.

To the flange $b$ are secured a series of rods or arms, $d$, which extend up through the chamber C, and are curved inward at their upper ends, which are secured to a double-pointed spherical plug or valve, G, which is adapted to fit and tightly close the interior of the nozzle at the point $e$, where its diameter is contracted, thus forming a valve for shutting off the stream of water.

When the parts are in the position seen in Fig. 1 the water flows from the body or main portion of the pipe through the cylinder B and completely encircles the plug G, passing freely out through the open end $f$ of the nozzle, the water at the same time filling the chamber C and exerting its full pressure backward upon the piston D $b$, the surface area of which is greater than the cross-sectional area of the plug G, and consequently the pressure of the water against the upper side of the piston is sufficient to hold it immovably against the pressure of the water upon the inner side of the plug, which is thus prevented from being carried against its seat $e$ and shutting off the stream, as would otherwise be the case.

On one side of the nozzle, immediately below the chamber C, is placed a small auxiliary valve or stop-cock, H, provided with a handle, $g$, the plug 6 of the cock having a transverse aperture or passage, $i$, which can be brought into communication simultaneously with two apertures, $k\ l$, in the shell of the valve, placed opposite to or in line with each other, the former, $k$, communicating with the interior of the pipe or nozzle and the latter with the bottom of the chamber C, and thus when it is desired to close the main valve G and shut off the stream the cock H is turned into the position seen in Fig. 2, when the water from the interior of the pipe will be admitted to the bottom of the chamber C at full pressure, thus equalizing the water-pressure upon both sides of the piston D $b$, when the pressure of the water on the inner side of the plug G will immediately force it up against its seat $e$ and shut off the stream of water. When it is desired to again let on the stream of water the cock H is turned onequarter way round, which shuts off the water from the bottom of the chamber C, and at the same time brings a passage, m, in the plug 6, which opens into the atmosphere at 10, into line with the aperture l, when the water in the chamber C beneath the piston is free to escape as the latter is forced downward by the pressure of the water on its upper side, this downward movement of the piston thus causing the plug G to be drawn away from its seat e into the position seen in Fig. 1 to let on the stream, as desired.

From the foregoing it will be seen that the pressure of the water is caused to automatically operate the plug G in both directions to shut off or let on the stream, the only manual force required being that needed to turn the cock H, which, on account of its small size and the absence of pressure thereon, can be operated with the greatest ease, thus entirely avoiding one of the greatest objections incident to the use of shut-off nozzles as heretofore constructed. Furthermore, as the main valve G is merely moved toward and away from its seat and is not subjected to any rubbing action, it is free from liability to wear and leak when closed, as is the case with large ground surfaces moving in contact with each other.

The above-described nozzle possesses the advantages of extreme simplicity, cheapness of construction, and non-liability to get out of order, while it can be closed very gradually, if desired, by turning the cock H in such manner as to admit the water slowly into the bottom of the chamber C beneath the piston, thereby adapting the nozzle to be used with hydrants or fire-plugs without the employment of a relief-valve, as the sudden increase of pressure ordinarily produced by shutting off the stream is avoided. When, however, the nozzle is to be used with fire-engines or steam-pumps, the usual relief-valve is to be employed to prevent the bursting of the hose when the stream is shut off by the closing of the valve G.

It is evident that the construction of the auxiliary valve or cock H may be varied, if desired, as any suitable easily-operated valve or cock which will admit the water to the chamber C beneath the piston and allow it to escape therefrom into the atmosphere may be employed without departing from the spirit of my invention; and, if desired, the shape of the plug or valve G may be varied; but I prefer to make it of the form shown and described.

What I claim as my invention, and desire to secure by Letters Patent, is—

1. In a hose-pipe nozzle, the valve or plug G, connected with and operated by a piston working in an open chamber, and having a surface area greater than the cross-sectional area of the valve or plug, whereby the backward pressure of the water on the piston is caused to hold the valve open against its tendency to be closed by the pressure of the water thereon, in combination with means for admitting water into the chamber beneath the piston to equalize the pressure upon opposite sides thereof, substantially as and for the purpose set forth.

2. In a hose-pipe nozzle, the combination, with the annular open chamber C, the piston D b, sliding therein, and the valve or plug G, connected by the rods d with the piston, of an auxiliary cock or valve, H, adapted when turned in one position to admit water from the pipe or nozzle into the chamber C beneath the piston to equalize the pressure upon opposite sides thereof, and thus cause the valve G to be automatically closed, and when turned into another position to shut off the water from the bottom of the chamber and allow that contained therein beneath the piston to escape to cause the valve G to be automatically opened, substantially as described.

3. In a hose-pipe nozzle, the combination of the cylinder B and the open annular chamber C, both adapted to contain water at the same pressure, the piston D b, and valve G, connected together and having different surface areas exposed to the pressure of the water, and the valve or cock H, with its passages i m and apertures k l, all constructed to operate substantially in the manner and for the purpose set forth.

4. The combination, with a hose-pipe nozzle having a valve-seat, e, of the spherical plug G, adapted to move longitudinally within the nozzle in the line of its axis, and a piston working in an open chamber, and having a surface area greater than that of the cross-sectional area of the plug, and means whereby the pressure of the water is caused automatically to shut off or let on the stream, as required, substantially as set forth.

Witness my hand this 23d day of May, A. D. 1882.

LORING D. SHAW.

In presence of—
P. E. TESCHEMACHER,
W. J. CAMBRIDGE.